Figure 1:
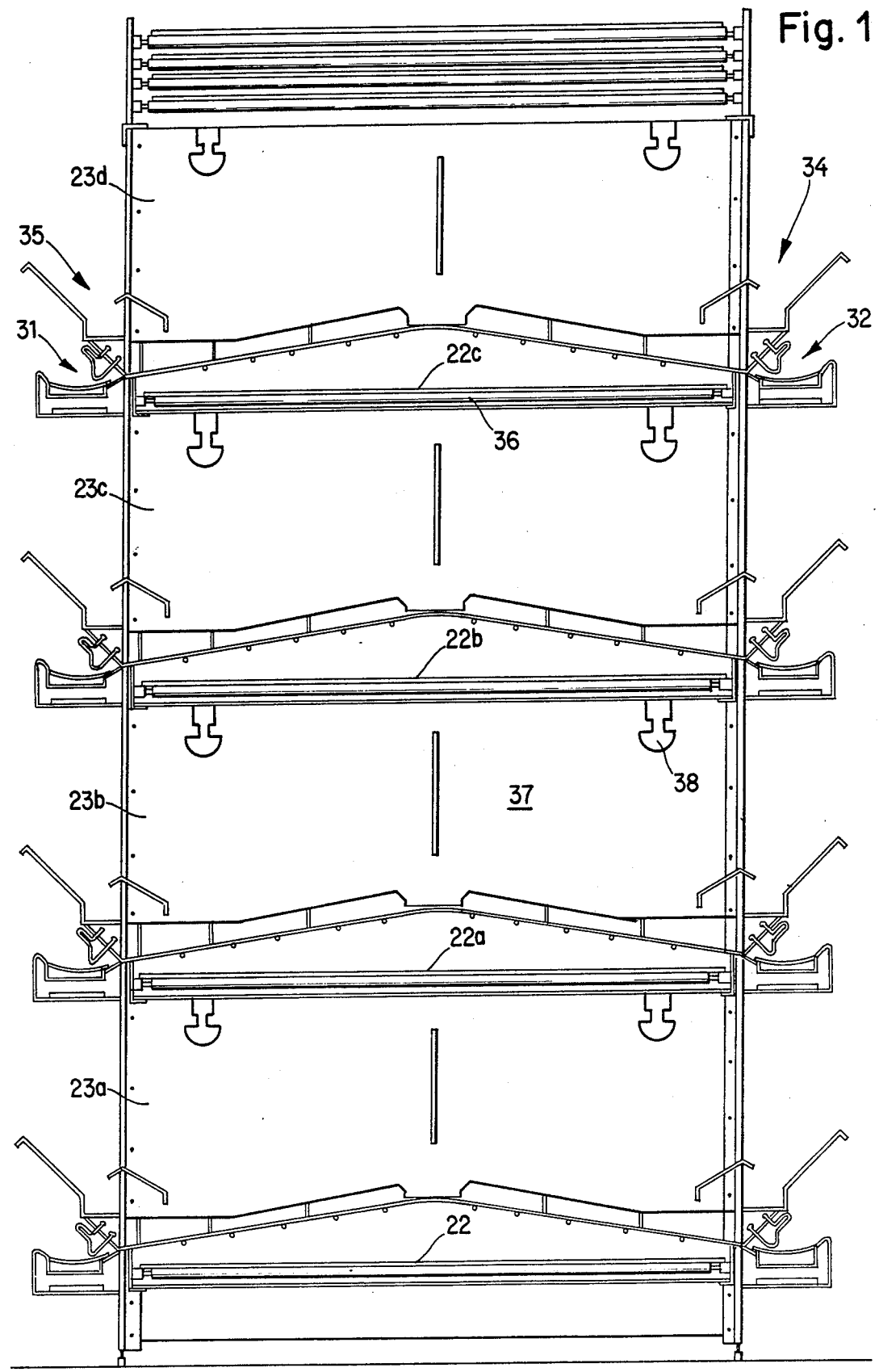

United States Patent [19]
Kühlmann

[11] Patent Number: 4,936,257
[45] Date of Patent: Jun. 26, 1990

[54] ARRANGEMENT FOR COOPS FOR POULTRY FARM

[76] Inventor: Josef Kühlmann, Königstr. 51, D-4419 Laer, Fed. Rep. of Germany

[21] Appl. No.: 243,301
[22] PCT Filed: Jan. 14, 1988
[86] PCT No.: PCT/DE88/00016
 § 371 Date: Aug. 2, 1988
 § 102(e) Date: Aug. 2, 1988
[87] PCT Pub. No.: WO88/05258
 PCT Pub. Date: Jul. 28, 1988

[30] Foreign Application Priority Data

Jan. 22, 1987 [DE] Fed. Rep. of Germany ....... 3701677
Jun. 11, 1987 [DE] Fed. Rep. of Germany ....... 3719465

[51] Int. Cl.$^5$ .............................................. A01K 31/04
[52] U.S. Cl. ..................................................... 119/22
[58] Field of Search .............................. 119/17, 21, 22

[56] References Cited

U.S. PATENT DOCUMENTS

| | | | |
|---|---|---|---|
| 2,843,086 | 7/1958 | Graham | 119/22 |
| 3,662,714 | 5/1972 | Poon | 119/22 X |
| 3,978,819 | 9/1976 | Lovitt | 119/22 |
| 4,242,809 | 1/1981 | Elder | 119/22 X |

FOREIGN PATENT DOCUMENTS 1217692 5/1966 Fed. Rep. of Germany .

Primary Examiner—Robert P. Swiatek
Attorney, Agent, or Firm—Peter K. Kontler

[57] ABSTRACT

1. Coop arrangement for poultry farms.
2.1 In the prior art, the droppings conveyor belts which are disposed below the superimposed rows of coops are conveyed back in the region of the coop arrangement below the coops. This results in various drawbacks.
2.2 To eliminate these drawbacks, it is proposed that the return runs of all the droppings conveyor belts be conveyed back together, above or below the superimposed rows of coops, downstream of a scraping device for the droppings.
2.3 To eliminate the previous expense for drying the droppings, a layout is proposed in which the droppings conveyor belts are guided through a drying channel. The drying air circulating in this drying channel dries the droppings which then fall from the droppings conveyor belts and can be delivered to a collecting apparatus.

26 Claims, 4 Drawing Sheets

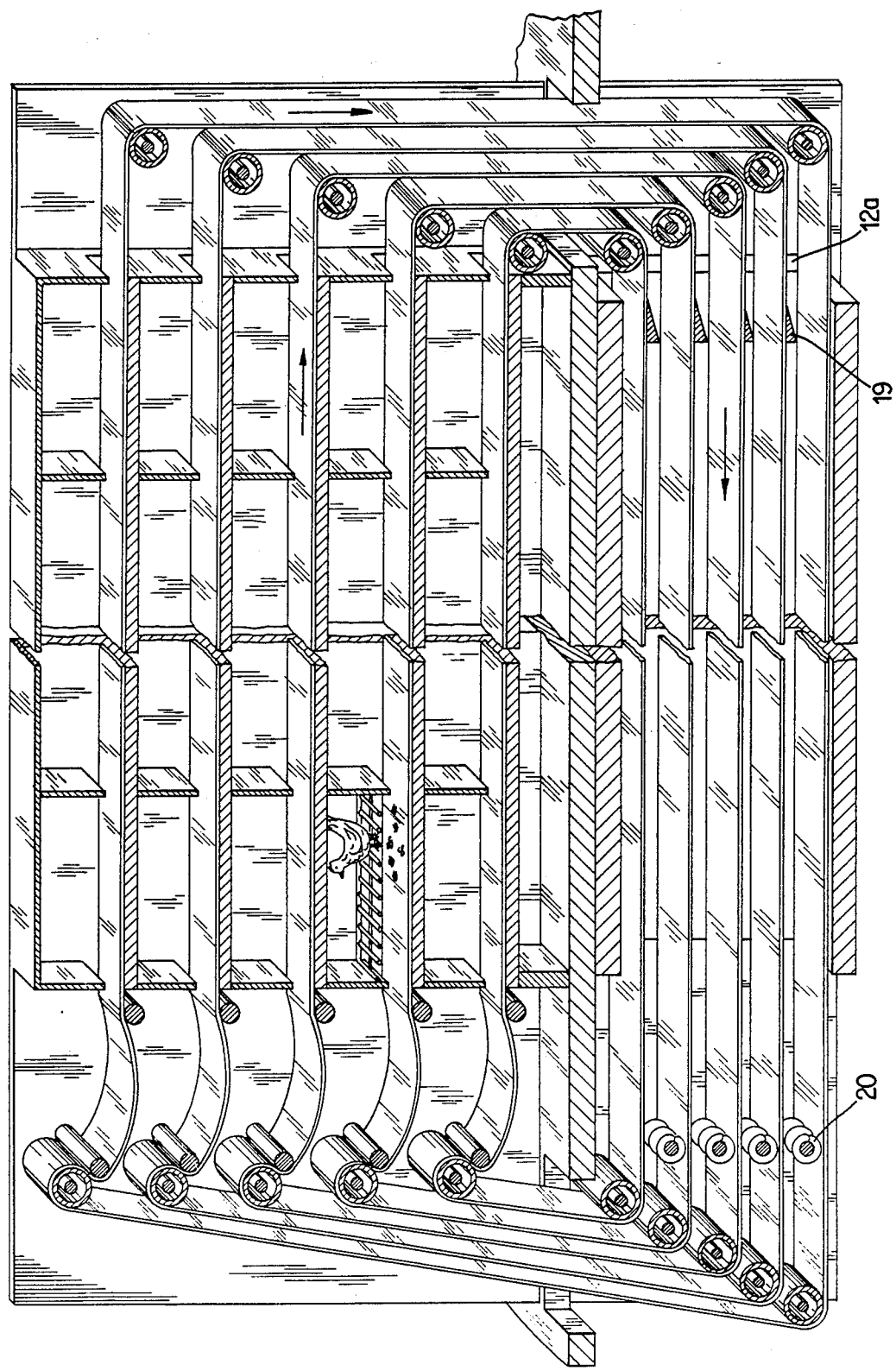

ARRANGEMENT FOR COOPS FOR POULTRY FARM

The invention relates to a coop arrangement according to the preamble of the main claim.

Coop arrangements of this type are in widespread use. A droppings conveyor belt driven and guided along an endless path is located beneath each of the superimposed rows of coops and receives the droppings on its working run, i.e., the upper run, discharges the same externally of the rows of coops and is then deflected so that the return run is conveyed back into the coop below the working run.

This known arrangement has the drawback that space is required within the confines of the superimposed rows of coops for the return of the lower run. The West German Offenlegungsschrift 34 46 665 clearly illustrates that a substantial amount of space is here necessary to insure a satisfactory return of the return run.

Should the working run be damaged, droppings fall through the supporting rolls onto the upper side of the return run. This can result in accumulations on the deflecting rolls. These accumulations on the deflecting rolls can cause the deflecting rolls to increase in diameter, although not uniformly over the entire length of the deflecting roll so that the precision of movement of the belt is significantly affected. If the belt does not travel accurately in its guide, the belt and belt guides are further damaged so that these faults are additive.

The return run travels through the rows of coops with its "dropping side" facing down. If the scraper has here not operated properly, droppings adhering to the return run can fall onto the animals in the row of coops below.

Since the watering nipples in the individual rows of coops are never one hundred percent leakproof, it is not possible to prevent water, which again accumulates at the deflecting and working rolls, from collecting between the working run and return run of the known arrangement. This also results in a poor operating efficiency and further contamination of the belt by caked dust and the like.

It is an object of the invention to design the return path of the return run in such a manner that, for a given height of the overall coop arrangement, the space within the individual coops is increased, that is, more free space becomes available above the animals, and that the drive for the droppings conveyor belts can be constructed with fewer problems This object of the invention is achieved by the teaching of the main claim.

An advantageous embodiment is set forth in the subclaim 2.

In other words, the invention proposes that the return paths of the respective return runs of the superimposed droppings conveyor belts not be disposed within the rows of coops but, instead, that the return runs be combined either above or below the rows of coops and then again be conveyed to the inlet side of the coop arrangement. The droppings conveyor belts thus encircle the entire coop arrangement.

In this manner, the space which was heretofore required for the return path of the return run can, within each individual coop, be made available to the animals. Thus, the increased headroom required in the coops by EG regulations can ge assured without increasing the height of the overall arrangement.

In the event of damage to the droppings conveyor belt, the droppings no longer fall on the return run but, rather, on the droppings conveyor belt below so that the droppings can no longer cause accumulations in the region of the deflecting and drive rolls. Water which drips onto the belts from the watering devices can be dried by the drying air in the stall since the drying air can now pass through the large volume of the coops and the water cannot, as previously, collect in the relatively small space between the working run and return run.

The U.S. Pat. No. 3,385,266 discloses a coop arrangement for poultry farms in which a droppings conveyor belt is arranged below the row of coops. Furthermore, a channel for the guidance of drying air is provided beneath the droppings conveyor belt and the drying air is sucked out of the interior of the stall and conveyed over the droppings via an exhaust fan.

The known facility is designed such that the droppings conveyor belt below the coop arrangement consists of an endless belt. The belt, which is preferably composed of kraft paper, is unwound from a supply roll and delivered to a collecting apparatus by means of a deflecting roll. The belt is packed together with the dried droppings on the same and prepared for shipment.

With respect to this known arrangement, it is a further object of the invention to provide a method of drying and removing droppings which requires the least possible in the way of equipment and, in particular, allows the height of the overall coop arrangement, as well as maintenance costs, to be minimized.

This object of the invention is achieved by the teaching of claim 3.

In other words, contrary to the generic arrangement, it is proposed to provide an endless, circulating conveyor belt for each row of coops which, after traversing the row of coops, is conveyed through a drying channel such that the droppings on this conveyor belt adhere to the underside and, in particular, are pressed onto this underside by deflecting rolls. The drying air conveyed in the channel which, in contrast to the generic facility, contacts the conveyor belt with the droppings directly in the channel dries the droppings here since they are disposed on the conveyor belt in the form of a very thin layer. The droppings which fall from the droppings conveyor belt inside the channel are caught and removd by a droppings conveyor apparatus disposed within the channel.

Exemplary embodiments of the invention are described below with reference to the drawings.

In the drawings

Figure 2:
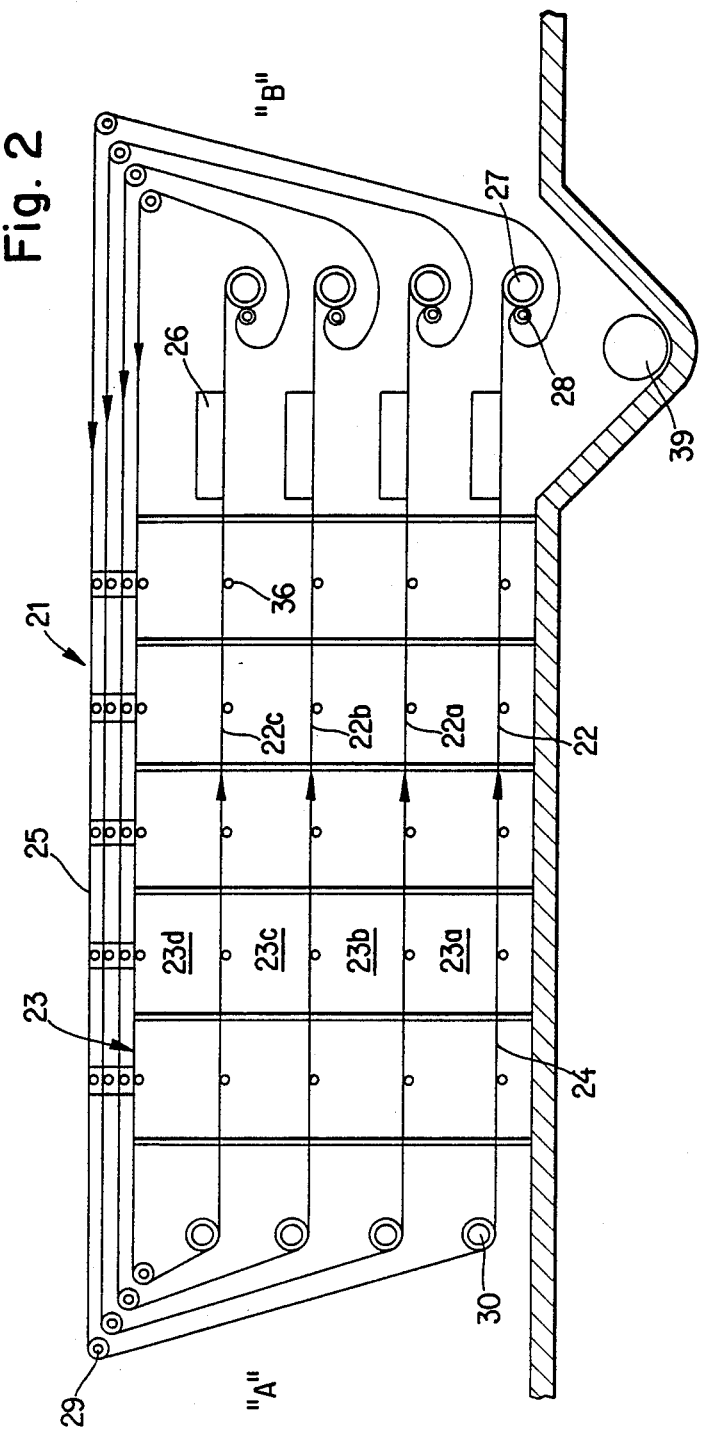
Figure 3:
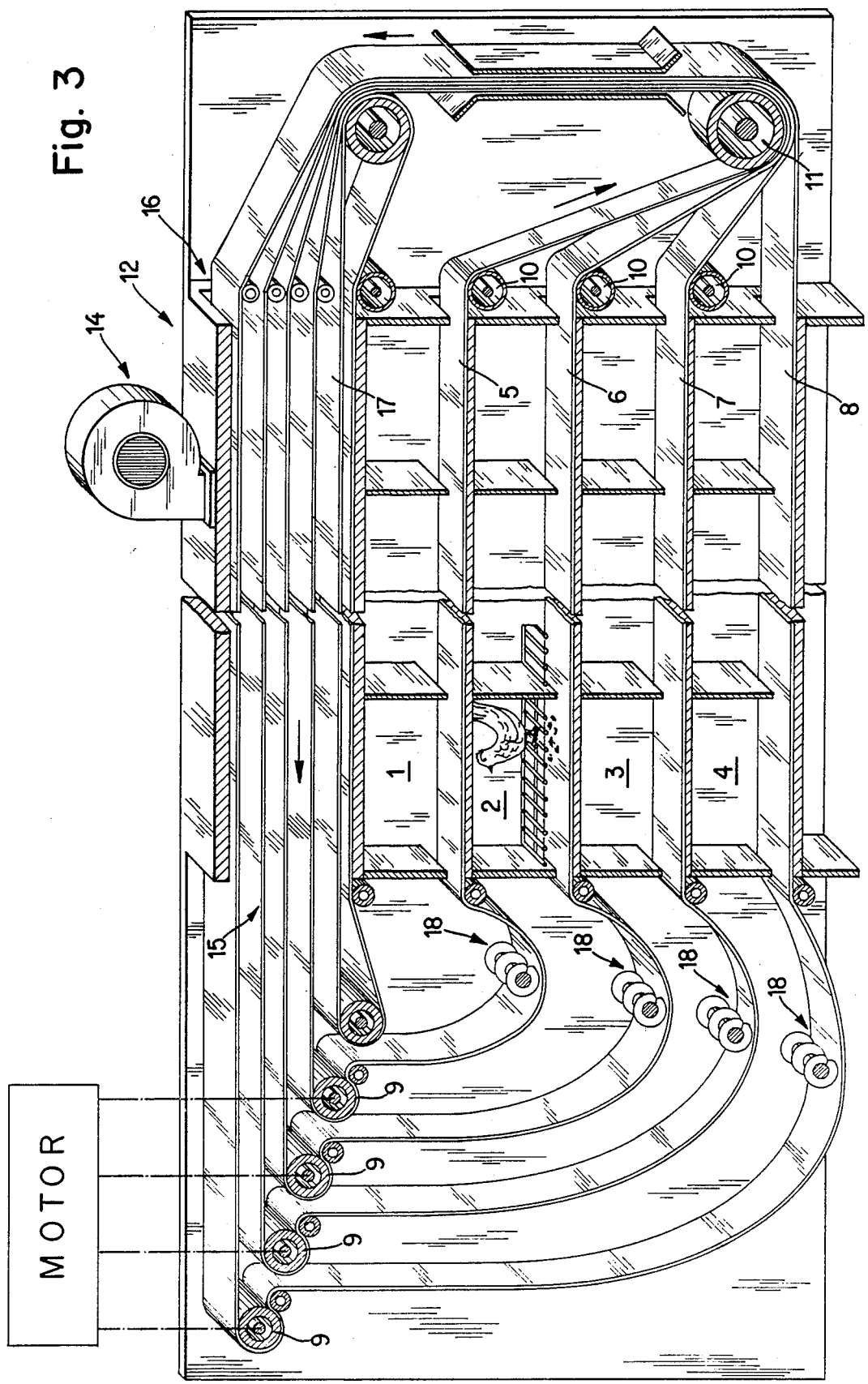

FIG. 1 is a section through a coop arrangement with superimposed coops,

FIG. 2 schematically illustrates the guidance of the belts,

FIG. 3 diagrammatically and also schematically illustrates the layout of the droppings collecting and drying apparatus according to the invention with a drying channel located above the coops, and FIG. 4 illustrates a layout in which the drying channel is located below the coops.

In FIG. 1, 23a–23d identify four superimposed pairs of coops. Egg collecting belts 31 and 32 are associated with each coop level. The required feeding troughs are indicated at 34 and 35. A respective droppings conveyor belt 22,22a,22b,22c passing over guide rolls 36 is disposed below each of the coops. The openings 38 required for the watering nipples are observable in the dividing walls 37 separating the individual coops.

The overall coop arrangement 21 is seen in FIG. 2 and it is further seen that each of the droppings conveyor belts 22,22a,22b,22c has a working run 24 and a return run 25. The droppings conveyor belts 22,22a, 22b,22c are guided below the coops 23a–23d which are situated next to one another in horizontal direction. Scraping devices 26 for the droppings disposed on the upper side of the working run 24 are disposed externally of the rows of coops 23 and each working run 24 is subsequently guided about a tension roll 27 which cooperates with a pressure roll 28. In the exemplary embodiment illustrated in FIG. 2, each belt is then deflected upwards at an exit side B of the coop arrangement and travels back to an entry side A of the coop arrangement as a return run 27. The required deflecting rolls and guide rolls are observable in FIG. 2.

Deflecting rolls 29 and 30 which again accurately guide the belts into the horizontal planes of the individual rows of coops are shown in the region of the entry side A.

A screw conveyor 39 for removing the droppings scraped from the working runs 24 is illustrated below the droppings scraping devices 26.

In FIG. 3, 1,2,3 and 4 identify four superimposed rows of coops which are of conventional design so that they need not be further described here. A droppings conveyor belt 5,6,7 and 8 is arranged below each row of coops. The droppings travel to the upper side of each droppings conveyor belt from the grating-like floor of each row of coops. The droppings conveyor belts are driven by a driven which is not particularly illustrated in the drawing, for example, via the respective deflecting rolls 9, and the drive preferably operates slowly and intermittently in dependence upon the quantity of the droppings. At the end of each row of coops, the droppings-laden run of each droppings conveyor belt 5 to 8 is then directed to a pressing roll 11 by means of corresponding deflecting rolls 10 and the layer of droppings on the upper side of the droppings conveyor belt is here pressed onto the belt. By bringing back the different droppings conveyor belts 5,6,7 and 8, the droppings layer on each belt is firmly pressed. Thereafter, these belts are conveyed vertically upwards and then guided back through a drying channel 12. The belts are again spaced from one another in the drying channel proper through the agency of suitable guide rolls or similar devices. The channel 12 is equipped with a blower 14 which, in the illustrated exemplary embodiment, is mounted on the channel approximately centrally over the longitudinal axis of each row of coops and is in the form of an exhaust fan. Consequently—since the ends of the channel are open—relatively warm stall air is sucked out of the actual stall structure and through the channel via these open ends, which thus function as air suction openings 15 and 16, and discharged by the blower 14. The air which is sucked in thereby sweeps over the layer of droppings on each droppings conveyor belt. Since the droppings conveyor belts circulate suitably slowly and the channel is suitably long, the droppings on the droppings conveyor belts are dried completely. Beneath those runs of the droppings conveyor belts which pass through the channel 12 is a droppings conveyor apparatus 17 extending parallel to the conveying direction of the droppings conveyor belts and having an upper run inside the channel. The returning lower run can be placed outside of the channel. The droppings which fall from the droppings conveyor belt 5 travel to the droppings conveyor apparatus 17 and are discharged at the end of the same to thereby advance into a trough formed by the returning run of the droppings conveyor belt 5. A screw conveyor 18 for the dried droppings can be provided in this trough. The droppings which fall from the droppings conveyor belt 6 travel to the return trough of the droppings conveyor belt 7 and are here likewise removed by a screw conveyor 18. It has been found that it is not absolutely necessary to provide such screw conveyors. Instead, an automatic discharge of the droppings onto a terminal removing device not illustrated in the drawing occurs by simply inclining the conveyor belts slightly in the region of the trough or by the provision of a scraper.

In the embodiment of FIG. 4 which, in principle, is designed in the same manner, a channel 12a is provided below the rows of coops. The individual droppings conveyor belts are deflected vertically downwards upon leaving the coop arrangement and then travel into the channel 12a which is likewise equipped with a suitable blowing device intended for the delivery of dry, warm air.

In the exemplary embodiment illustrated in FIG. 4, it is possible to additionally provide scrapers 19 which operate at the undersides of the belts and, in the exemplary embodiment illustrated in FIG. 4, the screw conveyors for the droppings are indicated at 20.

I claim:

1. A nesting structure for poultry, comprising a plurality of coops at different levels; a plurality of discrete conveying elements for removing droppings from said coops, each of said conveying elements being arranged to receive droppings from a different one of said coops; and means defining an endless path for each of said conveying elements, each of said paths having a first portion extending by the respective coop and in which the respective conveying element travels in a first direction, and each of said paths having a second portion in which the respective conveying element travels in a second direction counter to the first direction, all of said second portions being situated either above or below the uppermost or the lowermost of said plurality of coops.

2. The structure of claim 1, wherein a row of coops is disposed at each of said levels.

3. The structure of claim 1, wherein each of said elements comprises an endless band.

4. The structure of claim 1, further comprising a plurality of devices for removing droppings from said conveying elements, each of said devices being arranged along a different one of said paths downstream of the first portion and upstream of the second portion.

5. The structure of claim 1, wherein said defining means comprises a pair of cooperating rollers for each of said conveying elements, each pair of rollers being arranged downstream of the first portion of the respective path and upstream of the second portion.

6. The structure of claim 5, wherein one roller of each pair is a tension roller and the other roller is a pressure roller.

7. The structure of claim 5, wherein said defining means comprises a deflecting roller for each of said conveying elements, each deflecting roller being arranged downstream of the second portion of the respective path and upstream of the first portion.

8. The structure of claim 1, further comprising drive means for said conveying elements, said drive means being designed to operate intermittently.

9. A nesting structure for poultry, comprising a plurality of coops at different levels; a plurality of conveying elements for removing droppings from said coops, each of said conveying elements being arranged to receive droppings from a different one of said coops; means defining an endless path for each of said conveying elements, each of said paths having a first portion extending by the respective coop and in which the respective conveying element travels in a first direction, and each of said paths having a second portion in which the respective conveying element travels in a second direction counter to the first direction, all of said second portions being situated either above or below said coops; means for drying the droppings carried by at least one of said conveying elements, said drying means including a housing defining a drying channel which coincides with a predetermined portion of the path of said at least one conveying element; and means for discharging dried droppings from said drying means, said discharging means including a discharging member at least partially disposed in said channel below said predetermined portion of the path.

10. The structure of claim 9, wherein said coops are disposed in a first area and said housing is disposed in a different second area, said housing being provided with at least one opening establishing communication between said first area and said channel; and further comprising means for establishing air flow from said first area into and along said channel via said at least one opening.

11. The structure of claim 10, said housing having two ends which are spaced along the path of said at least one conveying element; and wherein said at least one opening is provided in one of said ends and another opening is provided in the other of said ends.

12. The structure of claim 10, wherein said establishing means is designed to draw air from said first area into said channel by suction.

13. The structure of claim 9, wherein said at least one conveying element has a side which faces, and receives droppings from, the respective coop in the first portion of the respective path, said defining means being designed such that said side faces downwards in the predetermined portion of the path.

14. The structure of claim 9, wherein said channel is disposed above the coop corresponding to said one conveying element.

15. The structure of claim 9, wherein said defining means comprises a compressing roller downstream of the first portion of the path for said at least one conveying element and upstream of the predetermined portion of the path, said compressing roller being arranged to press the droppings carried by said at least one conveying element against the same.

16. The structure of claim 15, wherein said compressing roller is arranged to deflect said at least one conveying element.

17. The structure of claim 15, wherein said at least one conveying element travels at a predetermined speed and the rotational speed of said compressing roller exceeds said predetermined speed.

18. The structure of claim 15, wherein said compressing roller has a relatively large diameter.

19. The structure of claim 9, wherein said discharging means comprises means for directing said discharging member along an endless path having an upper portion in which said discharging member travels in a preselected direction and receives dried droppings from said at least one conveying element and a lower portion in which said discharging member travels in a direction counter to said preselected direction, said upper portion being located in said channel and said lower portion being located below said channel.

20. The structure of claim 19, wherein said discharging member comprises an endless band.

21. The structure of claim 9, wherein said channel is disposed below the coop corresponding to said at least one conveying element.

22. The structure of claim 9, wherein a predetermined portion of the path of each of said conveying elements extends through said channel.

23. The structure of claim 22, wherein said discharging means comprises a respective discharging member below each of said predetermined portions.

24. The structure of claim 23, wherein said channel has a downstream end and said discharging members are disposed in the region of said downstream end.

25. The structure of claim 23, wherein each of said discharging members comprises a screw conveyor.

26. The structure of claim 22, further comprising a plurality of devices in said channel for removing droppings from the respective conveying elements.

* * * * *